United States Patent
Graves et al.

(10) Patent No.: US 7,578,439 B2
(45) Date of Patent: Aug. 25, 2009

(54) SYSTEM AND METHOD FOR AUTHORIZING STORED VALUE CARD TRANSACTIONS

(75) Inventors: Phillip Craig Graves, Atlanta, GA (US); Merrill Brooks Smith, Atlanta, GA (US); Phil M. Chakiris, Atlanta, GA (US)

(73) Assignee: e2Interactive, Inc., Atlanta, GA (US)

( * ) Notice: Subject to any disclaimer, the term of this patent is extended or adjusted under 35 U.S.C. 154(b) by 288 days.

(21) Appl. No.: 11/691,766

(22) Filed: Mar. 27, 2007

(65) Prior Publication Data

US 2007/0187492 A1 Aug. 16, 2007

Related U.S. Application Data

(63) Continuation-in-part of application No. 10/655,828, filed on Sep. 5, 2003, which is a continuation-in-part of application No. 10/411,971, filed on Apr. 11, 2003, now Pat. No. 7,083,084, which is a continuation of application No. 09/641,363, filed on Aug. 18, 2000, now Pat. No. 6,575,361.

(60) Provisional application No. 60/149,740, filed on Aug. 19, 1999.

(51) Int. Cl.
*G06K 5/00* (2006.01)

(52) U.S. Cl. .................. 235/380; 705/14
(58) Field of Classification Search .......... 235/380; 705/14

See application file for complete search history.

(56) References Cited

U.S. PATENT DOCUMENTS

| | | | |
|---|---|---|---|
| 3,958,103 A | 5/1976 | Oka et al. | |
| 5,365,046 A | 11/1994 | Haymann | |
| 5,577,109 A | 11/1996 | Stimson et al. | |
| 5,732,136 A | 3/1998 | Murphree et al. | |
| 5,870,724 A | 2/1999 | Lawlor et al. | |
| 5,903,830 A | 5/1999 | Joao et al. | |
| 5,956,695 A | 9/1999 | Carrithers et al. | |
| 6,182,894 B1 | 2/2001 | Hackett et al. | |
| 6,295,522 B1 | 9/2001 | Boesch | |

(Continued)

OTHER PUBLICATIONS

Sep. 26, 1997, Smart Card Update, vol. 2, Issue 19; Retail Delivery Systems News; Phillips Business Information.

(Continued)

*Primary Examiner*—Allyson N Trail
(74) *Attorney, Agent, or Firm*—Hunton & Williams LLP

(57) ABSTRACT

A computer-implemented method for processing a stored-value card transaction request in a card data management system is presented. The management system has a central processor in communication with one or more point-of-sale terminals over a communications network. Each terminal has a unique terminal identifier and is associated with a location and a prepaid card merchant. The central processor is in communication with a database having stored therein a plurality of card records. Each of these card records contains data associated with a stored-value card distributed to a prepaid card merchant for further distribution to purchasers at a location controlled by the prepaid card merchant. The transaction request comprises a requesting terminal identifier, a card identifier assigned to a stored value card, and information indicative of a requested transaction type. The method further comprises determining if the requesting terminal is authorized to request the requested transaction type for the stored value card.

29 Claims, 9 Drawing Sheets

U.S. PATENT DOCUMENTS

| | | |
|---|---|---|
| 6,333,976 B2 | 12/2001 | Lesley |
| 6,529,880 B1 | 3/2003 | McKeen et al. |
| 6,581,827 B2 | 6/2003 | Welton |
| 6,612,487 B2 | 9/2003 | Tidball et al. |
| 6,827,260 B2 | 12/2004 | Stoutenburg et al. |
| 6,829,596 B1 | 12/2004 | Frazee |
| 6,918,537 B2 | 7/2005 | Graves et al. |
| 6,934,689 B1 | 8/2005 | Ritter et al. |
| 6,957,336 B2 | 10/2005 | Wheeler et al. |
| 7,003,495 B1 | 2/2006 | Burger et al. |
| 7,043,451 B2 | 5/2006 | Strayer et al. |
| 7,073,198 B1 | 7/2006 | Flowers et al. |
| 7,086,584 B2 | 8/2006 | Stoutenburg et al. |
| 7,093,761 B2 | 8/2006 | Smith et al. |
| 7,096,003 B2 | 8/2006 | Joao et al. |
| 7,131,582 B2 | 11/2006 | Welton |
| 7,168,615 B2 | 1/2007 | Smith |
| 7,195,151 B2 | 3/2007 | Licciardello et al. |
| 7,249,175 B1 | 7/2007 | Donaldson |
| 2002/0035539 A1 | 3/2002 | O'Connell |
| 2002/0069139 A1 | 6/2002 | Bernstein et al. |
| 2003/0004737 A1 | 1/2003 | Conquest et al. |
| 2003/0088462 A1 | 5/2003 | Carrithers et al. |
| 2003/0144909 A1 | 7/2003 | Flaherty et al. |
| 2003/0163389 A1 | 8/2003 | Merten et al. |
| 2004/0049427 A1 | 3/2004 | Tami et al. |
| 2004/0172339 A1 | 9/2004 | Snelgrove et al. |
| 2004/0195316 A1* | 10/2004 | Graves et al. ............... 235/380 |
| 2004/0230536 A1 | 11/2004 | Fung et al. |
| 2005/0061872 A1 | 3/2005 | Paschini et al. |
| 2005/0143051 A1 | 6/2005 | Park |
| 2005/0242171 A1 | 11/2005 | Smets et al. |
| 2006/0249570 A1 | 11/2006 | Seifert et al. |
| 2007/0007333 A1 | 1/2007 | Foss et al. |
| 2007/0118478 A1 | 5/2007 | Graves et al. |
| 2007/0179865 A1 | 8/2007 | Hibler et al. |
| 2007/0185782 A1 | 8/2007 | Shooks et al. |

OTHER PUBLICATIONS

International Search Report, PCT Application No. PCT/US07/66598, dated Nov. 13, 2007, 9 pages.

* cited by examiner

SYSTEM AND METHOD FOR AUTHORIZING STORED VALUE CARD TRANSACTIONS

RELATED APPLICATIONS

This application is a continuation-in part of U.S. application Ser. No. 10/655,828, filed Sep. 5, 2003, which is a continuation-in-part of U.S. application Ser. No. 10/411,971, filed Apr. 11, 2003, now U.S. Pat. No. 7,083,084, which is a continuation of U.S. application Ser. No. 09/641,363 filed Aug. 18, 2000, now U.S. Pat. No. 6,575,361, which claims priority to U.S. Provisional Application No. 60/149,740 filed Aug. 19, 1999, all of which are incorporated herein by reference in their entirety.

The application is related to U.S. application Ser. No. 10/698,084, filed Nov. 3, 2003, now U.S. Pat. No. 7,028,891, U.S. application Ser. No. 10/732,641, filed Dec. 10, 2003, now U.S. Pat. No. 7,093,761, and U.S. application Ser. No. 10/712,812, filed Nov. 13, 2003, now U.S. Pat. No. 7,168,615, all of which are continuations-in-part of U.S. application Ser. No. 10/411,971, filed Apr. 11, 2003, now U.S. Pat. No. 7,083,084, and U.S. application Ser. No. 10/253,243, filed on Sep. 24, 2002, which claims priority to U.S. Provisional Application Nos. 60/396,404 filed Jul. 15, 2002 and 60/324,333 filed Sep. 24, 2001, all of which are incorporated herein by reference in their entirety.

The application is also related to U.S. application Ser. No. 10/831,922, filed Apr. 26, 2004, now U.S. Pat. No. 6,918,537, which is incorporated herein by reference in its entirety.

BACKGROUND OF THE INVENTION

The present invention relates, generally, to remote data management, and, more particularly, to management of stored-value card data. In general, stored-value card data is information relating to services and/or products the cost of which has been prepaid by the owner or end user of the card. Examples of prepaid services that may be accommodated by a stored-value card include long distance telephone communication, wireless communication, paging and internet-enabled communication services, including wireless web access, emergency road service, legal service, accounting service, tax service, property cleaning and/or maintenance service, clothes cleaning service, transportation service, travel service, delivery service, online (or off-line) dating service, electrical and/or gas service, water service, sewage service, internet access, and film processing (including digital film processing). Other examples of stored-value or prepaid cards include gift cards, prepaid gas cards, prepaid grocery cards, prepaid entertainment cards, prepaid movie cards, downloadable ring tone cards, downloadable game cards, downloadable movie cards, downloadable music cards that use MP3, MP4, WMV, WAV, or other music formats, any other downloadable software card, customer rewards cards, bridge and/or road toll cards, and any other type of stored-value cards for products, services, or both, that may be prepaid by the owner of the card. Stored value cards may also be used to pay bills or to insert value into customer accounts.

The general model for stored-value cards involves a customer purchase of a card from a merchant for a face value or for a customer-determined value. Each card has an identification number that may be printed and/or magnetically stored on the card. The identification number is also stored in a file in a database maintained by the card issuer. This file is also used to store the value of the card. In the traditional business model, when the cards are sent to the retail location from which they will be sold the corresponding records in the database are already activated, thus allowing the card to be used immediately by a customer.

Depending on the type of card, the card may be used by physically presenting the card to a retailer at the time of purchase or, as is typically the case for telecommunications purchases, by relating the identification number and/or a personal identification number (PIN) to a service provider. For example, to use the card as a prepaid long distance card, the customer dials a toll free number to access the card issuer's system, enters the identification number, and then makes the desired long-distance call. During the call, the value of the card in the database is reduced as a function of phone charges accumulated during that call. When the value of the card is exhausted, the call terminates. If the customer ends the call before the value of the card is exhausted, the remaining value may be used for additional calls. Once the entire value of the card has been used, the card is discarded.

Preactivated card systems have several disadvantages. For example, since the cards are active while on the shelf in the retail location, the cards may be stolen by a thief and easily used. One way to address some of the drawbacks of prior art prepaid phone card systems would be to install activation terminals unique to the stored-value or prepaid card issuer. This is referred to as a "closed system." U.S. Pat. No. 5,577,109 by Stimson et al. discloses such a closed system. In the Stimson system, the cards are not preactivated. Each of the retail locations from which cards are to be sold is provided with a dedicated activation terminal which allows the retail operator to set the value of the card at the time of the sale. The activation terminal connects to the card issuer's system to pass along the value amount and to request activation of the card. Depleted cards can be recharged in the same manner as they are sold. A serious disadvantage of the Stimson system is that it requires single-function, dedicated hardware to be installed in each retail location, resulting in a very inflexible and expensive system.

It would be further desirable to provide a system that allows for selectively processing stored-value card requests, such as stored-value card activation, deactivation, and/or incrementing, based on a table of predefined codes associated with respective user groups.

SUMMARY OF THE INVENTION

An aspect of the invention provides a computer-implemented method for processing a stored-value card transaction request in a card data management system having a central processor in communication with a plurality of point-of-sale terminals over a communications network. Each of the one or more terminals has a unique terminal identifier and is associated with a location and a stored-value card merchant. The central processor is in communication with a database having stored therein a plurality of card records. Each card record contains data associated with a stored-value card distributed to a stored-value card merchant for further distribution to purchasers at a location controlled by the stored-value card merchant. The method comprises receiving the stored-value card transaction request from a requesting terminal, the requesting terminal being one of the plurality of point-of-sale terminals. The transaction request comprises a requesting terminal identifier, a card identifier assigned to a stored value card, and information indicative of a requested transaction type. The method further comprises determining if the requesting terminal is authorized to request the requested transaction type for the stored value card. The method still further comprises, responsive to a determination that the requesting terminal is authorized to request the requested transaction type, initiating the requested transaction. The method also comprises transmitting a request response to the requesting terminal.

Figure 1:
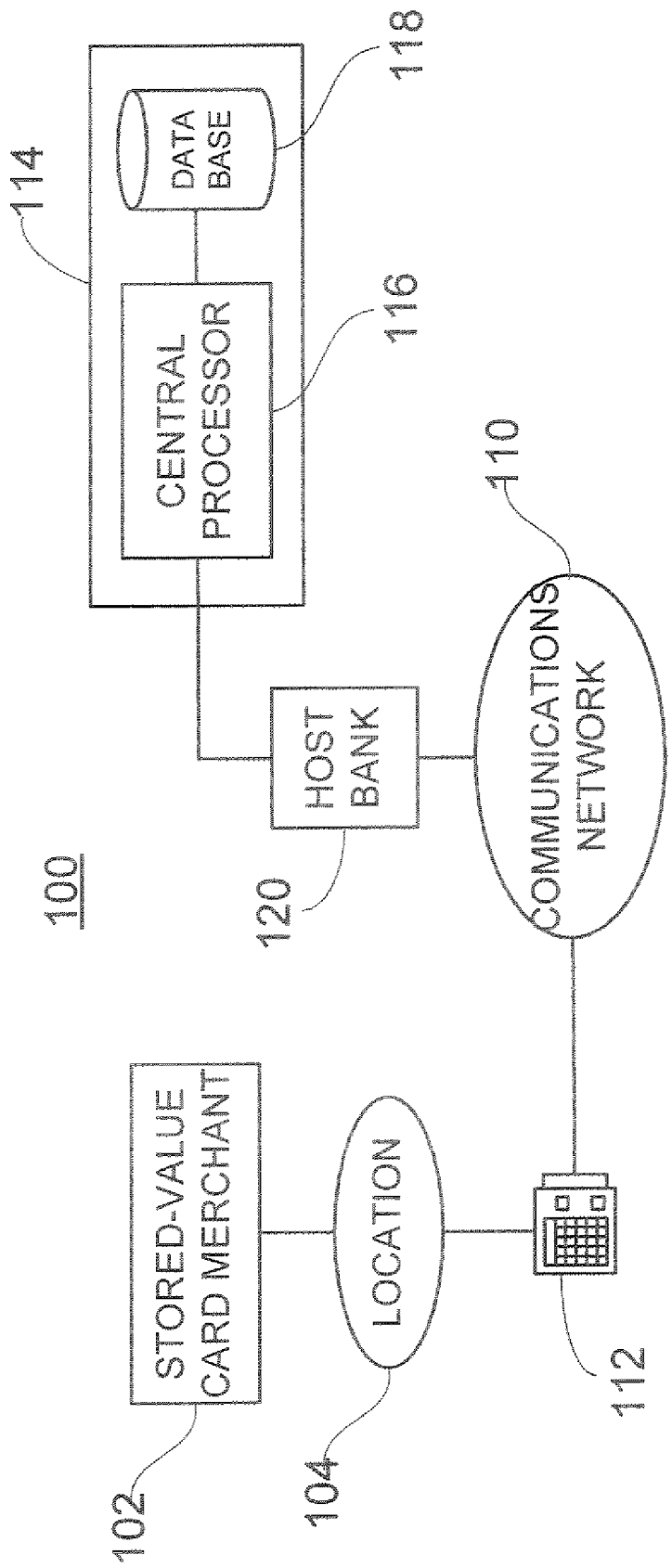
FIG. 1 is a schematic representation of a stored-value card system according to an embodiment of the invention.

Before any embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF EXEMPLARY EMBODIMENTS

Glossary

Customer/Distributor. A customer/distributor is a customer of the assignee of the present invention who performs the role of distributor by managing a set of stored-value cards and subordinate entities that use the stored-value card data management system of the present invention.

Merchant. A merchant is a stored-value card-selling business unit or business chain that can be subordinate to other merchants, or have other merchants subordinate to it. An arbitrary number of hierarchy levels and branching complexity can be supported at the merchant level. In one illustrative embodiment, the database is implemented to support up to eight merchant levels in order to conveniently halt excessive tree recursion in the case of circular or lost dependencies. It will be appreciated, however, that each database element may be designed to permit the number of levels to be extended beyond eight by the change of a single parameter in any given element.

Location. A location is a business unit, typically, but not exclusively, a single physical store, directly subordinate to a single merchant. A location has one or more terminals that may be used for submitting stored-value card activation or redemption requests. Locations with terminals authorized for card activation are referred to as activation locations while locations with terminals authorized for card redemption are referred to as redemption locations. As used herein, the term "location" does not necessarily refer to a unique geographic location. It is, instead, a way of describing a particular group of terminals that are typically, but not necessarily, located in a particular geographic location (e.g., a retail outlet).

Terminal. A terminal is a physical credit or debit-card terminal. Each terminal is subordinate to one and only one location. A terminal may be authorized to submit stored-value card activation requests, redemption requests or both activation and redemption requests.

Transaction Control

The present invention provides a system for managing stored-value cards that provides control over the entities that can request activation, deactivation, reloading and redemption of stored-value cards. This control is accomplished by establishing a hierarchy of merchants, locations and terminals and allocating authorizations to the various levels. For example, the system may be adapted to communicate with a top layer of customers/distributors, an intermediate layer of one or more merchants associated with each customer/distributor, and a bottom layer of terminals distributed among various merchant locations. The system allows for controls to be established at any of these levels so that, for example, a particular merchant could be authorized to request activation, deactivation and recharging of a stored-value card while another merchant is authorized to request redemption of stored-value card value. Authorization of various functions may also be allocated to a particular set of terminals controlled by a given merchant or at a given location.

FIG. 1 illustrates a system according to an embodiment of the invention in its simplest form. In the illustrated embodiment, a stored value card system 100 comprises a single stored value card merchant 2 having a single terminal 112 assigned to a single location 4. It will be understood that the merchant 2 is subordinate to a particular distributor of stored value cards. In this example and in those that follow, the distributor layer at the top of the hierarchy is omitted for simplicity of illustration. The terminal 112 is in communication with a data management system 114 comprising a central processor 116 and a database 118. As will be discussed in more detail hereafter, the central processor 116 is configured for receiving stored-value card transaction requests from one or more terminals, determining authorization for the requested transactions, and processing and storing stored-value card data in card data records stored in the database 118.

The terminal 112 is typically positioned at the prepaid card point-of-sale and is configured or reading or otherwise receiving data from stored-value cards distributed by card distributor to one or more stored-value card merchants. Each card carries information printed and/or encoded (e.g., on a magnetic stripe) on the card. This information typically includes an identifier unique to the particular card. As will be discussed hereafter, this card identifier may be used to associate prepaid value and other data with the card in a card record. The stored-value card is analogous to a valid credit or debit card, with no monetary value until activated. Although stored-value cards are typically made of plastic or other light and durable material and are the size of a credit card, they may be of virtually any material and geometry.

The terminal 112 may be configured with a card reader mechanism for reading the printed or encoded indicia on the stored-value card. Alternatively or in addition, the terminal 112 may be configured for manual entry of card information.

The terminal 112 is further configured to transmit a transaction request over the communications network 110. A transaction request may be a request to activate a card as part of a customer purchase of the card, a request to deactivate a card, a request to add value to (recharge) a card, and a request to redeem the value of the card as part of a service or merchandise purchase by a card user. Any terminal 112 is capable of transmitting any of these request types. However, as will be discussed, the central processor 116 will complete the requested transaction only if the terminal 112 is authorized for that request type. The terminal 112 typically has terminal identification information that can be used to distinguish it from other terminals that may communicate with the data management system 114. Some or all of this information may be used as a terminal identifier in communications between the terminal 112 and the central processor 116. As used herein, "terminal identifier" means information sufficient to distinguish a particular terminal from other terminals capable of communicating with a central processor. The terminal identifier may include, by way of example only, an electronic signature or a unique identification code. The terminal identifier may alternatively be a combination of terminal and location or retailer information. For example, a terminal may have assigned to it an identification code that is unique only for a particular location or retailer, but when provided in combination with a location or retailer code, uniquely identifies the terminal. The terminal identifier may be transmitted to the central processor 116 along with all transaction requests.

The communications network 110 may be any network such as a phone network, credit or debit card network, the Internet, an intranet, etc., over which credit or debit card transactions may be carried out. The network 110 may be a host-to-host network or may, as illustrated, make use of transaction network that routes the requests to the data management system 114 via a host bank 120. An example of this type of network would be the Visa network.

As noted above, the systems of the invention provide for transaction request authorization at multiple levels of the card merchant hierarchy. This is accomplished by (1) maintaining records of the locations associated with each card merchant and the terminals associated with each location and (2) establishing authorization for each transaction type for each level. In the simple hierarchy of the card system 100 of FIG. 1, however, the stored value card merchant 2 has only a single terminal 112 assigned to a single location 4. Thus, the merchant 2, the location 4 and the terminal 112 will all have the same authorization.

In an exemplary scenario, the card merchant 2 may be authorized for activation, deactivation and recharge of stored-value cards provided to the card merchant 2 by a distributor. The central processor 116 will maintain records in the database 118 that associate these authorizations with the location 4 and/or the terminal 112 for the specific cards provided to the merchant 2. If the central processor 116 receives from the terminal 110 a request to activate one of these cards, it will verify the authorization and facilitate the transaction. If, however, the central processor 116 receives from the terminal 110 a request to redeem the value of that same card, it will deny the request because the terminal 110 is not authorized to request redemption. This scenario would be typical for prepaid cards for telecommunication or other services that are sold by a retail outlet that is not directly affiliated with the service provider. It would also be representative of instances where a stored-value card sold by one retailer is redeemable for purchases only from another retailer.

In another exemplary scenario, the card merchant 2 may be authorized for redemption only. In this scenario, only requests for redemption received from the terminal 110 will be carried out by the central processor. Any other transaction requests will be denied.

Figure 2:
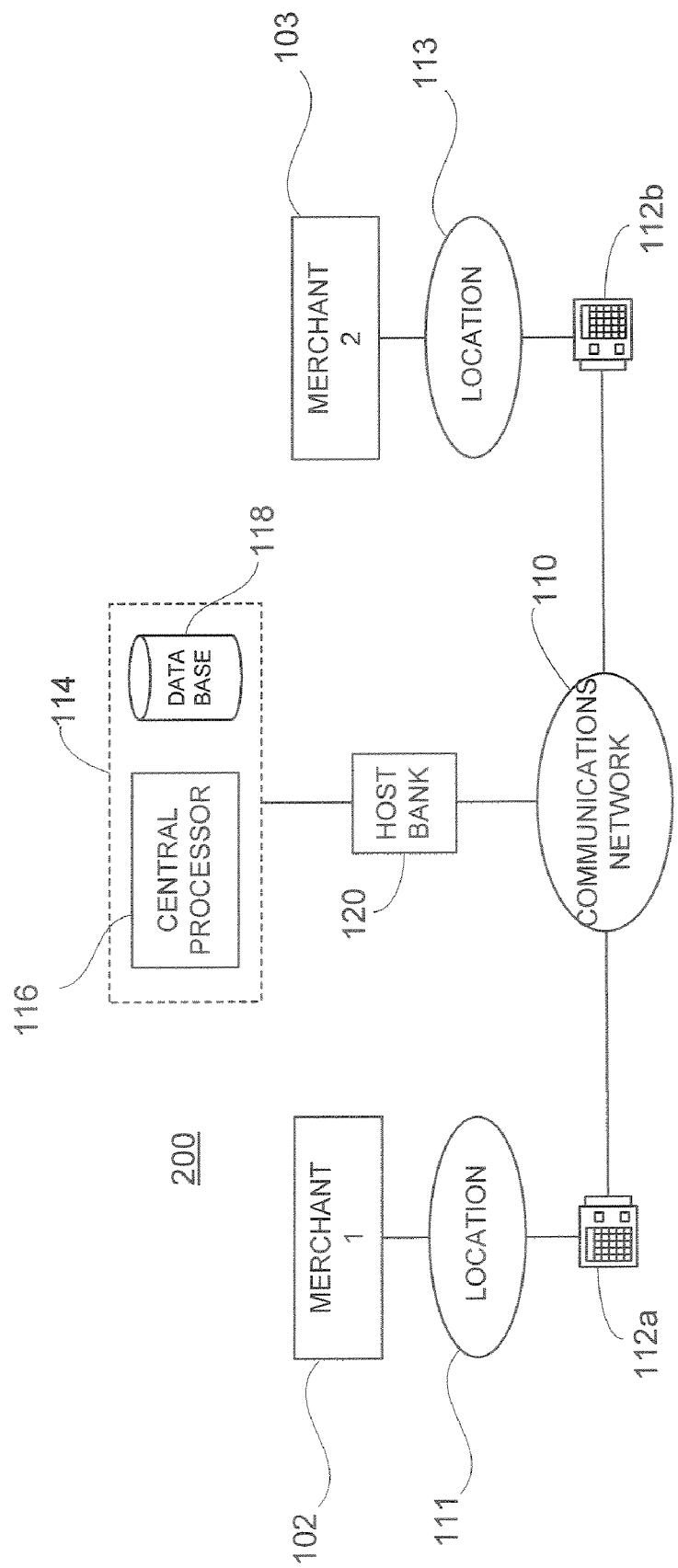
FIG. 2 is a schematic representation of a stored-value card system according to an embodiment of the invention.

In the system 100 illustrated in FIG. 1, the data management system 114 will handle only the transaction requests authorized for the merchant 2. Those transactions that are not authorized may not be carried out through the card management system 114. For example, if the stored-value cards sold by the card merchant 2 are intended to be redeemed by another card merchant, the redemption transaction is not carried out by the data management system 114 because the second card merchant is not included in the system 100. FIG. 2 illustrates a stored-value card system 200 that is similar to the previously described system except that a second merchant 103 is added. The second merchant 103 also has a single terminal 112b allocated to a single location 113. The terminal 112b of the second merchant 103 may be substantially identical to the terminal 112a of the first merchant 102 with the exception of its unique identifier. The terminal 112b may also be configured for communication over the same network 110.

Either or both of the merchants 102, 103 in the card system 200 may be provided stored-value cards by the distributor and either or both of the merchants 102, 103 may be given transaction authorizations for its own cards and/or those of the other merchant. Following the first of the earlier-described scenarios, the first merchant 102 may be granted authorization only to activate, deactivate and recharge a plurality of cards provided to it by a distributor. This authorization is associated by the central processor 16 with the terminal 112a allocated to the location 111 of the first merchant 102. The second merchant 103 may be granted authorization to redeem the cards provided to the first merchant 102. This is accomplished by associating the authorization of the location 113 and/or the terminal 112b of the second merchant 103 with the appropriate card records stored in the database 118.

It will be understood that the second merchant 103 may or may not be provided cards of its own by the distributor. If it is provided with cards, it will be provided separate authorizations for these cards that are independent of the authorizations for the cards distributed to the first merchant 102. It can thus be seen that cards that are redeemable only at the second merchant 103 could be sold by both merchants 102, 103.

Figure 3:
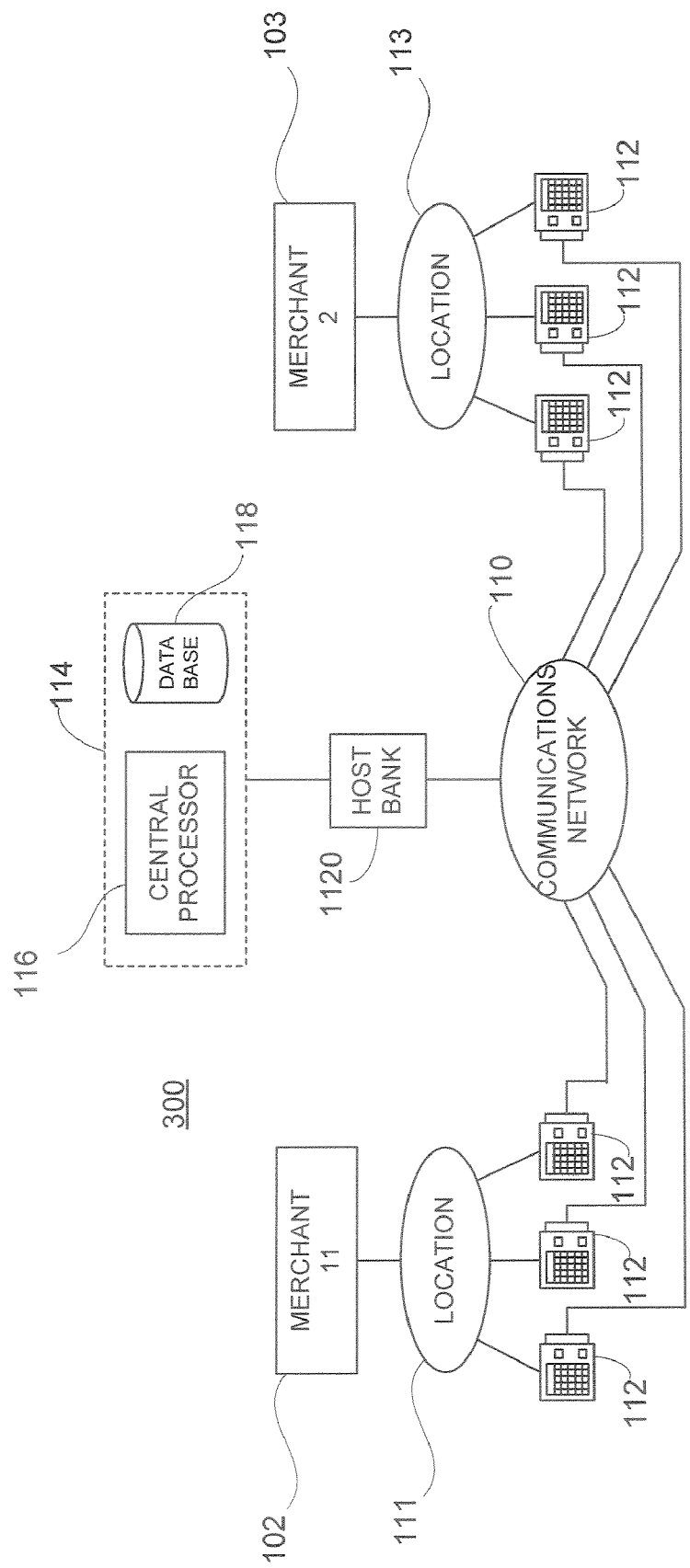
FIG. 3 is a schematic representation of a stored-value card system according to an embodiment of the invention.

FIG. 3 illustrates another two merchant system. In the stored-value card system 300 of FIG. 3, however, the first and second merchants 112, 113 each have a plurality of terminals 112 allocated to their single locations 111, 113. The terminals 112 may all be substantially identical with the exception of their unique identifiers. Operation of the system 300 may be substantially identical to the system 200 except that there is now an opportunity for variations in authorization within the hierarchy of each merchant. Specifically, the terminals 112 of the first merchant 102 need not all be given the same authorizations. For example, all three of the terminals 112 of the first merchant 102 may be authorized to request activation and recharge transactions but only one (e.g., a terminal at a customer service counter) may be authorized to request a deactivation request. Similarly, the terminals 112 of the second merchant 103 may be divided so that two are authorized for redemption, but only one is authorized for activation.

Figure 4:
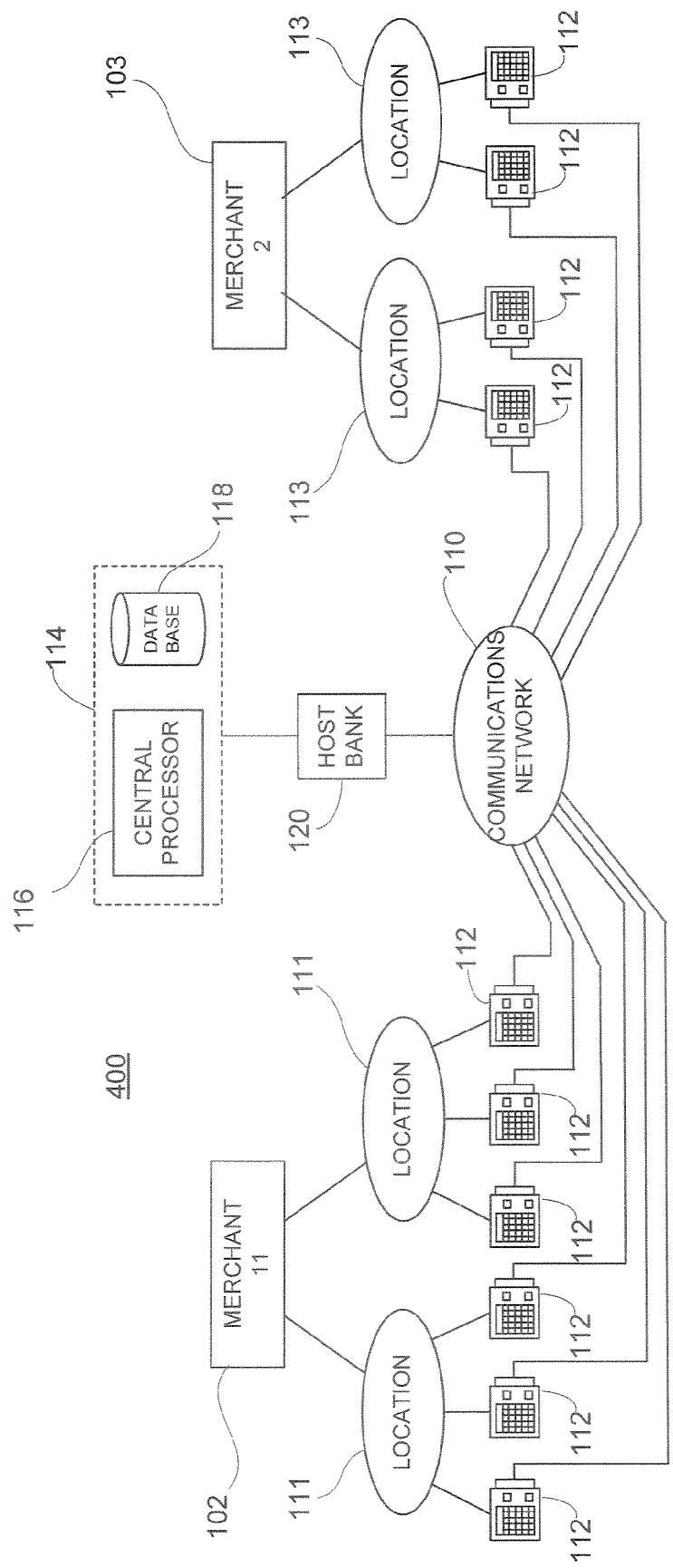
FIG. 4 is a schematic representation of a stored-value card system according to an embodiment of the invention.

In the card system 300, variations in authorization must be tied to specific terminals in the card records in the database 118. The authorization for the two single locations 111, 113 will be identical to the authorization of their respective merchants 102, 103. FIG. 4 illustrates another card system variation where this is not necessarily the case. The stored-value card system 400 of FIG. 4 illustrates an embodiment where the first and second merchants 102, 103 each have more than one location 111, 113. In this embodiment, each location 111, 113 may be allocated its own set of authorizations. For example, one of the locations 111 of the first merchant 102 may be authorized to request activation, deactivation and recharge, while the other location 111 is only authorized to conduct activation and recharge. In another example, one of the locations 113 of the second merchant 103, may be authorized to request activation, deactivation and recharge, while the other location 113 is authorized for activation, deactivation recharge and redemption.

The authorization of each location 111, 113 may be associated with the appropriate card records in the database 118 by the central processor 116. It will be understood that location level authorizations may be allocated in total to individual terminals 112 of each location or may be subdivided as described above for the card system 300.

Figure 5:
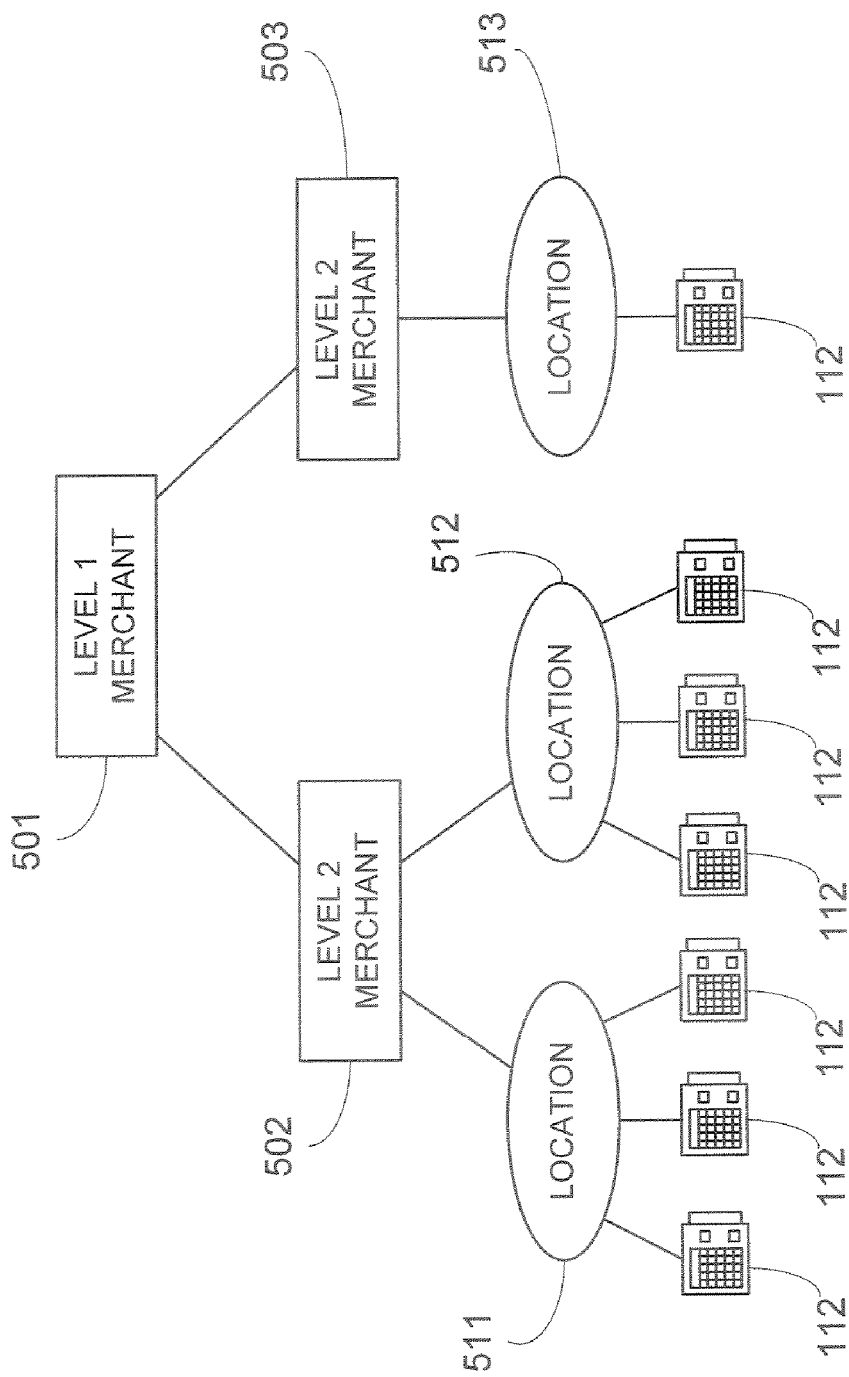
FIG. 5 is a schematic representation of a merchant-location-terminal hierarchy that may be incorporated into the stored-value card systems of the invention.
Figure 6:
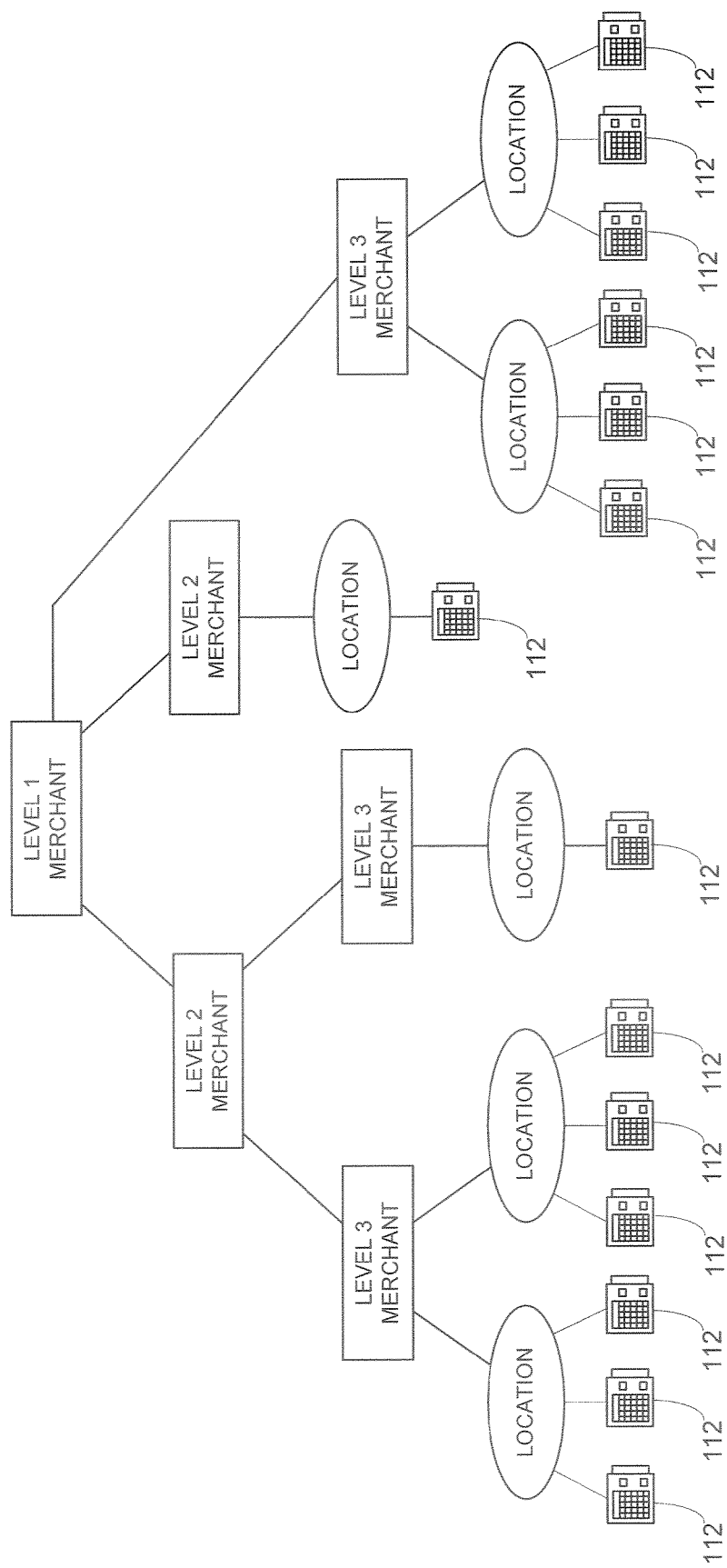
FIG. 6 is a schematic representation of a merchant-location-terminal hierarchy that may be incorporated into the stored-value card systems of the invention.

FIGS. 5 and 6 illustrate additional merchant hierarchies that may be accommodated by the stored-value card systems of the invention. Although the network and data management system are omitted from these illustrations, it will be understood that their interaction with the hierarchy constituents and, in particular, the terminals 112, is substantially similar to the previously described system embodiments. FIG. 5 illustrates a hierarchy having more than one merchant level. Specifically, a single first level merchant 501 is positioned over two second level merchants 502, 503. The first of the second level merchants 502 has two locations 511, 512, each having three terminals 112. The second of the second level merchants 503 has a single location 513 with a single terminal 112. The stored-value card systems of the invention provide the capability to allocate authorizations at any of the four layers shown in this hierarchy. For example, the first level merchant 501 may be given a set of authorizations for all transaction requests for cards distributed directly to it or to the second level merchants. The second level merchants 502, 503 may each be separately allocated any one or more of the authorizations allocated to the first level merchant 501. Each of the second level merchants 502, 503 may similarly allocate any one or more of its authorizations to its locations 511, 512, 513 and so on.

FIG. 6 illustrates an even more complex hierarchy that may be accommodated by the card systems of the invention. This hierarchy has as many as five authorization levels. As in the hierarchy of FIG. 5, every entity may have any or all of the authorizations assigned to the entity above it. The authorizations of any given terminal 112 at the bottom level are limited by the authorizations of each entity in the chain between that terminal 112 and the first level merchant at the top.

The merchants and terminals of any hierarchy can be divided into groups for the purpose of carrying out certain actions. Certain hierarchy constituents may be grouped, for example, for the purposes of billing, commission payment, reporting, inventory management, etc. Otherwise loosely related entities may also be grouped for purposes of transaction authorization. For example, terminal A from Merchant X and terminal B from merchant Y may both be members of Group A-1, the members of which all have the same authorizations, yet for billing purposes, terminal A may be in billing group B-1 and terminal B is in billing group B-2. Management and definition of these groups may be accomplished by the central processor, which will maintain all associations in the database along with the terminal authorizations.

Card Data Management System

Figure 7:
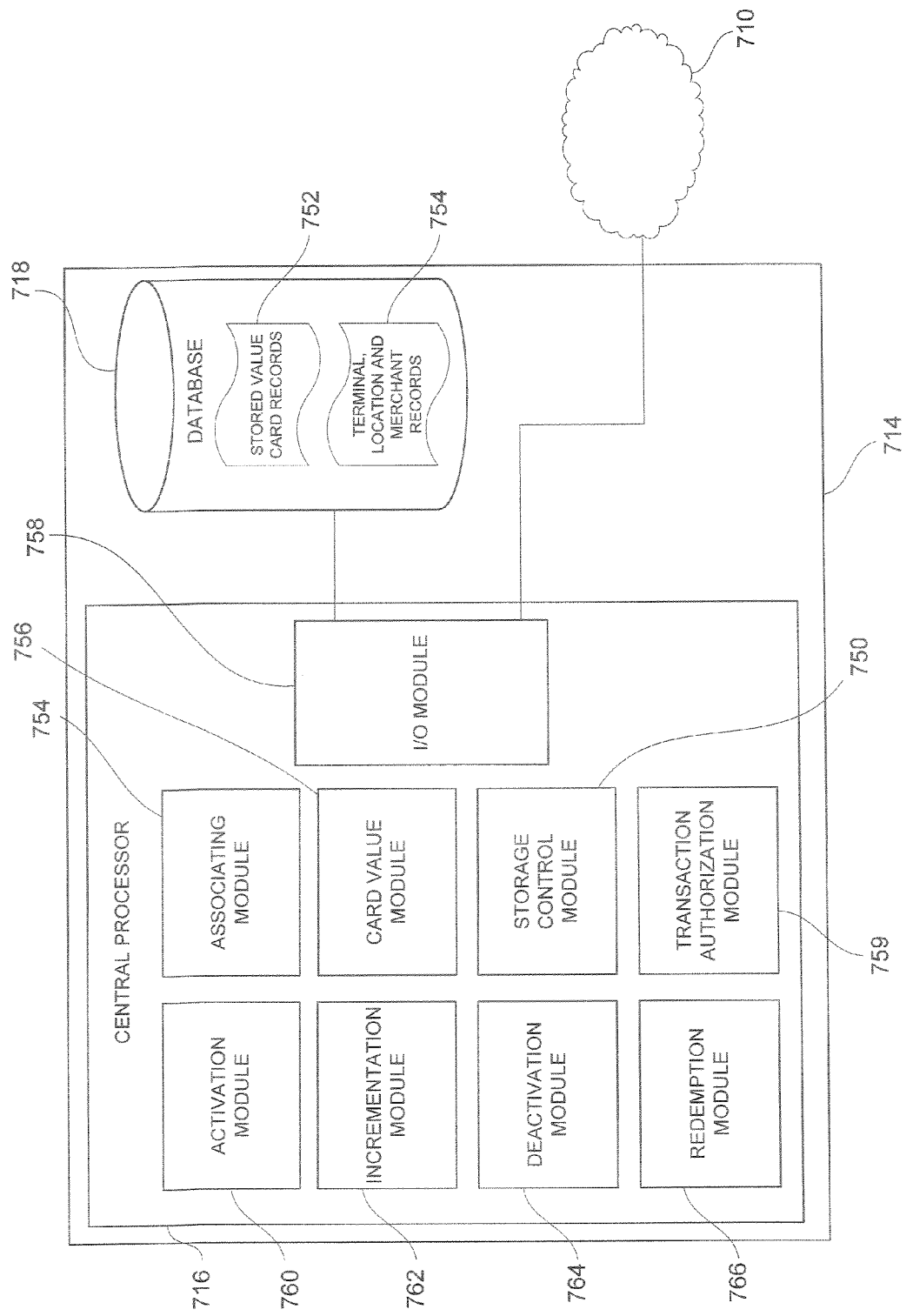
FIG. 7 is a schematic representation of a card data management system for use in conjunction with embodiments of the invention.

As discussed above, each of the stored-value card systems of the invention is managed through a data management system in communication with the card system's point-of-sale terminals. An illustrative data management system 714 that may be used in conjunction with the stored-value card systems of the invention is illustrated in FIG. 7. The data management system 714 comprises a central processor 716 and a database 718. The central processor 716 and the database 718 may reside on a single data processor or multiple processors interconnected by a network. The central processor 716 may itself comprise multiple processors any or none of which may be located with each other or with the database 718.

The central processor 716 comprises a series of modules adapted for managing stored-value card data records and transaction authorization records stored in the database and for receiving and responding to transaction requests received from point-of-sale terminals. As shown in FIG. 7, these modules may include a storage control module 750 that allows for storing in the database 718 a plurality of card records 752 comprising stored-value card data for each stored-value card. The stored-value card data may include information such as an active/inactive bit to indicate the status of the card, the stored value of the card, and identifiers associating the card with particular merchants, locations and terminals and their associated authorizations. The card data may also include transaction information relating to one or more past transactions. For example, the card data may include information such as the date and time of activation and the terminal from which the activation request was received. The card data could also maintain similar information from the last transaction processed.

The storage control module 750 may also be adapted for storing in the database 718 records regarding the merchant location/terminal hierarchies and associated authorizations. For example, the database 718 may have stored therein a terminal record for each terminal, a location record for each location and a merchant record for each merchant for which card data are being managed by the data system 714. A terminal record may, for example, include the unique terminal identifier associated with the terminal and a location identifier associated with the location to which the terminal is allocated. A location record may include the location identifier for the associated location, a merchant identifier associated with the merchant controlling the location, and any other information that may be desirable for monitoring and management functions of the system. A merchant record may include the merchant identifier of the associated merchant, an identifier for any parent entity to which the merchant is subordinate and any other information that may be desirable for monitoring and management functions of the system.

An associating module 754 is adapted for associating each stored-value card with the terminal identifiers of terminals authorized to request transactions for that card. The associating module 754 may receive these identifiers in several ways. One way is through the use of set-up cards. Setup cards are uniquely coded terminal-readable cards that may be used to associate terminals and locations with a particular set of stored-value cards. The set-up card code/identifier may be read at a particular terminal (e.g., by swiping a magnetic strip on the card) to be associated and transmitted to the central processor 716 along with the terminal identifier. The transmission is received at the central processor 716 and passed to the associating module 754 via an input/output module 758.

Each set-up card may be associated with a particular set of authorizations and particular merchant hierarchy elements. In an example scenario, a set-up card may be associated with a particular location and with the transaction authorizations for activation, deactivation and incrementation (recharge). When the set-up card is read by a terminal at the particular location, the terminal transmits its identifier and the set-up card identifier. The associating module 754 receives the transmission and creates the association between the terminal and the stored-value cards distributed to the location. The authorizations are also stored so that the cards of that location may only be activated, incremented or deactivated using that particular terminal. Redemption requests submitted by the terminal will be rejected.

As an alternative to the use of a set-up card, terminal identifiers may be separately transmitted to the central processor 716 in a data file. The file may be set up to include only the identifiers for terminals associated with a particular location and authorization set or may include information linking different groups of terminals to location identifiers and authorization combinations. The data file may be received from a merchant or a location over a network such as the Internet.

Terminal identifiers may also be manually entered into the data processor 716 by the stored-value card system administrator or by a merchant via an interface available over the Internet.

Once the terminal identifiers have been received, the associating module 754 may create an association between each terminal identifier and some or all of the cards distributed to the location of the terminal. This association may be recorded through the addition of the terminal identifier to the card record of each such card. The related authorization for the terminal relative to the card may also be added to the card record or stored separately.

The central processor may also comprise a value module 756 adapted to establish an initial value in each respective stored-value card. This initial value may reflect a predetermined "face value" that is established at the time the card record is initially created but is inactive until the card is activated. The card value could be a monetary amount could comprise other product or service-related units. For example, a prepaid telecommunications card could have a value denominated in time units. A prepaid music download card could have a value denominated in numbers of downloads. The value module 756 may also be adapted to work in conjunction with the transaction modules to establish and store an updated card value after a transaction has been processed.

The central processor 714 further includes an input/output module 758 in communication with one or more networks 710 over which the input/output module 758 may receive communication from point-of-sale terminals. The input/output module 758 may be configured for receiving transaction requests from such terminals and passing them to the appropriate transaction processing module. The input/output module 758 may also be configured for communicating a response to the transaction request back to the requesting terminal over the network 716. Each transaction request may include a terminal identifier, a stored-value card identifier and a transaction type indicator. Other information may be included depending on the type of transaction. For example, a redemption request may include the price of the product or service for which the stored value associated with a stored-value card is being redeemed. A response to a transaction request may include a positive transaction indicator (indicating a completed transaction) or a negative transaction indicator (indicating a denial of completion). A negative response may include a reason for denial. A positive response may include information related to the transaction such as the stored value of the stored-value card.

The input/output module 758 may transfer transaction requests to a transaction authorization module 759 configured for determining whether the terminal submitting a particular transaction request is authorized to do so. This determination may be accomplished by determining whether the terminal identifier in the request matches an authorized terminal identifier associated with the stored-value card and, if so, whether the associated terminal is authorized for the transaction type. The association between authorized terminal identifiers and a stored value card may be established in a variety of forms including by storing the authorized terminal identifiers in the card record itself or by storing a link to a separate record for the authorized terminal identifiers. The association may also include an indirect link through a merchant or location identifier.

Once the validity of a transaction request has been established, the transaction may be processed by one of a series of transaction modules. These may include, but are not limited to, an activation module 760, an incrementation module 762, a deactivation module 764, and a redemption module 766. The activation module 760 is configured to change the status of the appropriate card record to active. The incrementation module 762 is configured to add an incremental value to the value of the appropriate card record. The deactivation module 764 is configured to change the status of the appropriate card record to inactive. The redemption module 766 may be configured to determine whether the stored-value card has a stored value greater than the amount of the product or service purchase. It may also be configured to determine and store a post-transaction value for the card.

The central processor 716 of the card data management system 714 may be adapted to enable a web-based, ID-and-password-protected management application available to anyone with Internet access and the appropriate ID and Password. The system 714 may further comprise a reporting engine that allows for generating reports for sales analysis, inventory control and billing. The system 714 may still further comprise a trouble-shooting interface with visibility into each transaction, card, location, terminal and merchant. In operation, the system may use an automated card replenishment system that tracks unactivated card inventory at all locations and transmits an alert when the inventory falls below a predefined level.

Transaction Request Processing

Figure 8:
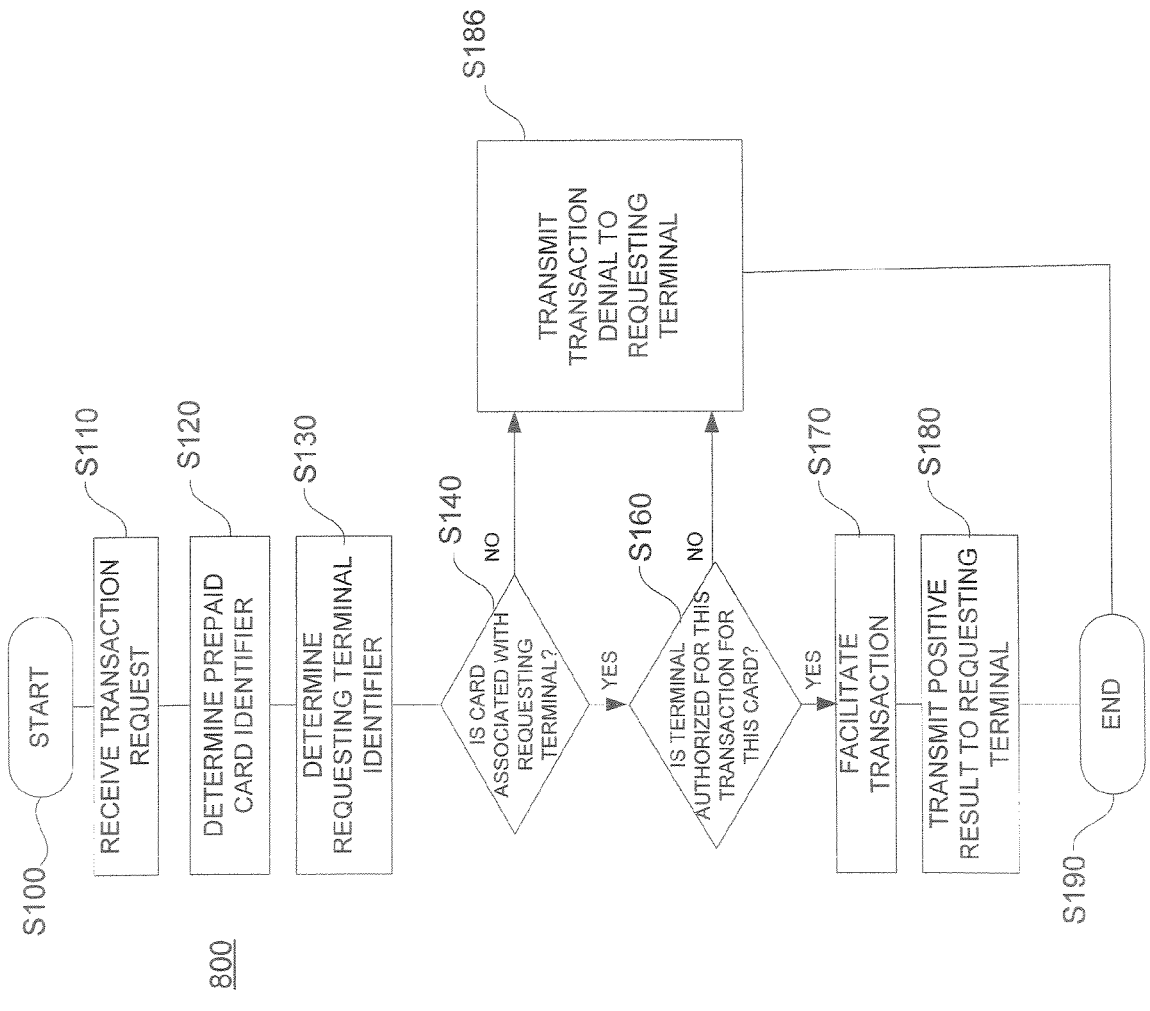
FIG. 8 is a diagram of a method of processing a stored-value-card transaction according to an embodiment of the invention.

FIG. 8 illustrates an exemplary method 800 of processing a stored-value card transaction request in a stored-value card system in which a plurality of cards have been distributed to one or more merchant locations each having one or more point-of-sale card-reading terminals. The method 800 begins at S100 and at S110 an activation request is received As discussed above, the content of the transaction request may depend on the type of transaction, but will generally include an indication of the transaction type, the terminal identifier, and the stored-value card identifier. At S120 and S130, the stored-value card identifier and the terminal identifier, respectively, are determined from the transaction request.

At S140, a determination may be made as to whether the stored-value card identified in the request is associated with the requesting terminal. As discussed above, the card data management systems of the invention each have a database of card records in which are stored information relating to distributed stored-value cards. Each of these card records may be associated with a set of terminals authorized to request transactions for a particular stored-value card. Information associating the card record and the identifiers of the authorized terminals is stored in the database. This information could be a list of the identifiers or it could be a location or merchant identifier that could be used to link to a list of terminals owned or controlled by the identified merchant or located at the identified location. Thus, the action S140 may include comparing the requesting terminal identifier to a specific list of authorized terminal identifiers associated with the card record. The associated list could even be stored in the card record itself. In some variations of the method 800, the action S140 may include determining the location or merchant associated with the requesting terminal, then determining whether the stored-value card was distributed to that particular card or merchant. The action S140 could also include comparing the requesting terminal identifier to an authorized subset of merchant or location terminals.

If the terminal identifier is not associated with the stored-value card, a denial is transmitted to the terminal at S186 and the method ends. If the terminal identifier is associated with the stored-value card a determination as to whether the terminal is authorized to request the current transaction type may be made at S160. This may be accomplished by checking the transactions associated with the terminal for this stored-value card. If the transaction is not authorized for this terminal for this card, a denial is transmitted to the terminal at S186 and the method ends. If the transaction is authorized, the transaction is processed at S170 and a positive request result is transmitted to the requesting terminal at S180. The positive request result may include information specific to the transaction requested. For example, the positive request result may include an updated value for the stored value card. The method ends at S190.

Figure 9:
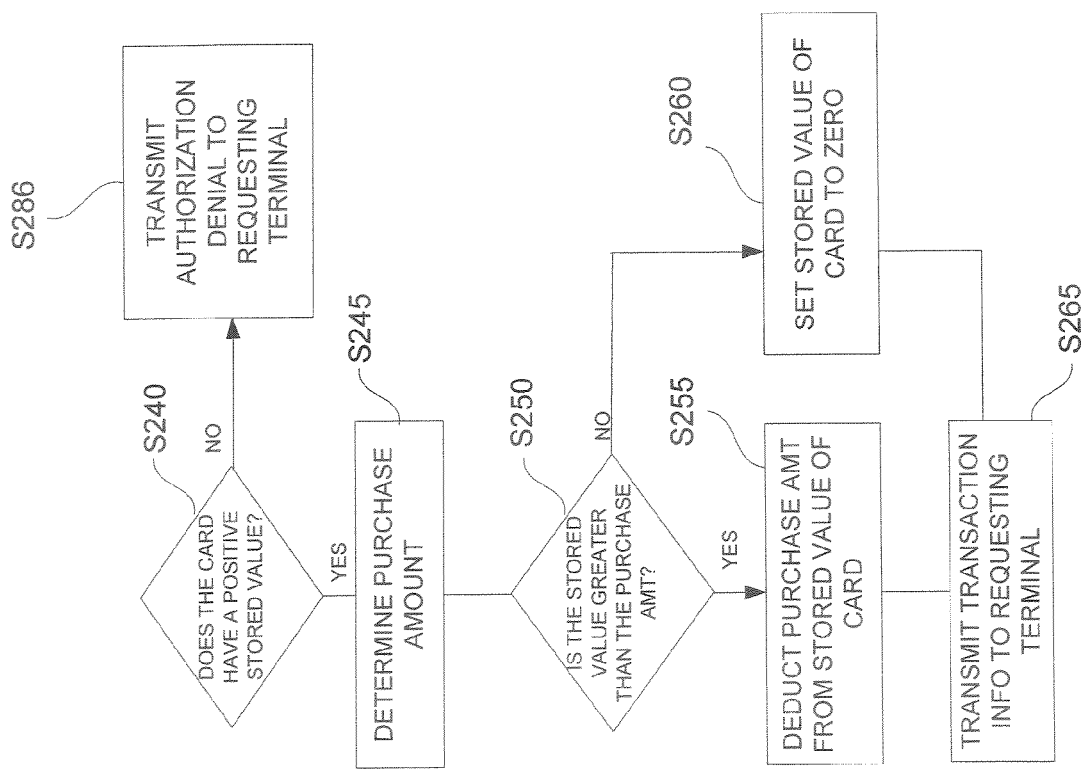
FIG. 9 is a diagram of actions that may be taken in a method of processing a stored-value-card redemption transaction according to an embodiment of the invention.

FIG. 9 illustrates some additional actions that may be added to the method 800 when the requested transaction is for stored-value card redemption. Some or all of these actions may be included as part of S170 is the method 800. The additional actions may include at S240 determining whether the stored-value card has a positive stored value. If it does not a transaction denial is issued at S286 and the method ends. If the stored-value card has a positive value, the method continues. The method 800 may include determining the purchase amount from the redemption request at S245. At S250, a determination may be made as to whether the stored value for the card is greater than the purchase amount. If it is not, the method may carry out one of several alternatives. In one alternative, the available value of the stored-value card may be applied to the purchase and a positive transaction result returned. This is illustrated in FIG. 9, which shows at S260, setting the card value to zero and transmitting transaction information to the requesting terminal at S265. Such information could be transmitted along with a positive transaction result. Another alternative would be to transmit a transaction denial with a message that the purchase exceeds the value of the card. This could require that the request be resubmitted for an amount no greater than the available value of the card.

If the stored value for the card is greater than the purchase amount, the purchase amount may be deducted from the stored value at S255. Transaction information may then be transmitted at S265 with a positive transaction result.

General Implementation

General aspects of possible implementation of the inventive technology will now be described. Various method and operating system embodiments of the inventive technology are described above. It will be appreciated that the systems of the invention or portions of the systems of the invention may be (or be implemented on) a "processing machine" such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As previously discussed, the processing machine used to implement the invention may be a general purpose computer. However, the processing machine described above may also utilize any of a wide variety of other technologies including a special purpose computer, a computer system including a microcomputer, mini-computer or mainframe for example, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the process of the invention.

It will be understood that in order to practice the methods of the invention as described above, it is not necessary that the processors and/or the memories of the processing machine be physically located in the same geographical place. That is, each of the processors and the memories used in the invention may be located in geographically distinct locations and connected so as to communicate in any suitable manner. Additionally, It will be understood that each of the processor and/or the memory may be composed of different physical pieces of equipment. Accordingly, it is not necessary that a processor be one single piece of equipment in one location and that the memory be another single piece of equipment in another location. That is, it is contemplated that the processor may be two pieces of equipment in two different physical locations The two distinct pieces of equipment may be connected in any suitable manner. Additionally, the memory may include two or more portions of memory in two or more physical locations.

To explain further, processing as described above is performed by various components and various memories. It will be understood, however, that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, a telecommunications network (e.g., a cellular or wireless network) or any client server system that provides communication, for example. Such communications technologies may use any suitable protocol such as TCP/IP, UDP, or OSI, for example.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

It will be understood that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, C#, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a magnetic stripe, a laser card, a smart card, a processor chip, a memory chip, a DVD, an integrated circuit, a hard disk, a floppy disk, an optical disk, a flash memory card, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, telephone (landline, cellular or wireless) voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from the spirit or essential attributes.

What is claimed is:

1. A computer-implemented method for processing a stored-value card transaction request in a card data management system having a central processor in communication with a plurality of point-of-sale terminals over a communications network, each of the one or more terminals having a unique terminal identifier and being associated with a location and a prepaid card merchant, the central processor being in communication with a database having stored therein a plurality of card records, each card record containing data associated with a stored-value card distributed to a prepaid card merchant for further distribution to purchasers at a location controlled by the prepaid card merchant, the method comprising:

receiving the stored-value card transaction request from a requesting terminal, the requesting terminal being one of the plurality of point-of-sale terminals, the transaction request comprising
        a requesting terminal identifier,
        a card identifier assigned to a stored value card, and
        information indicative of a requested transaction type;
    determining if the requesting terminal is authorized to request the requested transaction type for the stored value card;
    responsive to a determination that the requesting terminal is authorized to request the requested transaction type, initiating the requested transaction; and
    transmitting a request response to the requesting terminal.

2. A computer-implemented method according to claim 1 wherein the requested transaction type is one of the group consisting of card activation, card value incrementation, card deactivation, and card value redemption.

3. A computer-implemented method according to claim 1 further comprising the action of:
    associating in the database a set of authorized terminal identifiers with the stored-value card.

4. A computer-implemented method according to claim 3 wherein the action of determining if the requesting terminal is authorized comprises the action of:
    comparing the requesting terminal identifier to the set of authorized terminal identifiers.

5. A computer-implemented method according to claim 3 further comprising the actions of:
    determining criteria for authorizing terminals to request transactions for the stored value card; and
    assembling the set of authorized terminal identifiers based on the criteria for authorizing.

6. A computer-implemented method according to claim 5 wherein the criteria for authorizing include at least one of the set consisting of a terminal location requirement, a terminal ownership requirement, and terminal affiliation with a particular merchant.

7. A computer-implemented method according to claim 3 further comprising the actions of:
    associating in the database a set of one or more authorized transaction types with each authorized terminal identifier.

8. A computer-implemented method according to claim 7 wherein the action of determining if the requesting terminal is authorized further comprises the actions of:
    comparing the requesting terminal identifier to the set of authorized terminal identifiers; and
    responsive to a determination that the requesting terminal identifier matches an authorized terminal identifier, comparing the requested transaction type to the set of authorized transaction types associated with the authorized terminal identifier.

9. A computer-implemented method according to claim 1 wherein the stored-value card transaction is a card value redemption transaction and the transaction request further comprises a purchase amount.

10. A computer-implemented method according to claim 9 wherein the card record data includes a stored value for the stored-value card and the action of initiating the requested transaction comprises:
    determining from the database the stored value associated with the stored-value card;
    determining whether the purchase amount exceeds the stored value; and
    responsive to a determination that the purchase amount does not exceed the stored value, subtracting the purchase amount from the stored value.

11. A computer-implemented method according to claim 9 further comprising:
    responsive to a determination that the purchase amount exceeds the stored value, setting the stored value to zero.

12. A system for processing a request for a stored-value card transaction for a stored-value card, the transaction request being submitted by a retailer using a point-of-sale terminal that is one of a plurality of terminals capable of communicating over a network, each terminal having a unique terminal identifier and being associated with one of a plurality of merchants, the stored-value card transaction request comprising a unique card identifier for the particular stored value card, the terminal identifier of the point-of-sale terminal, and information indicative of a requested transaction type, the system comprising:
    a central processor in communication with the network, the central processor being adapted to receive the transaction request from the point-of-sale terminal;
    a database in communication with the central processor, the database having stored therein a plurality of stored-value card records, each comprising a unique card identifier associated with a stored-value card distributed to one of the plurality of merchants;
    an associating module in the central processor configured for associating, in the database, a set of authorized terminal identifiers with each stored-value card record;
    a transaction authorization module in the central processor configured for determining, based on information in the transaction request and the database, whether the requesting terminal is authorized to request the requested transaction type; and
    at least one transaction processing module in the central processor configured for processing the requested transaction responsive to a determination by the transaction authorization module that the requesting terminal is authorized to request the requested transaction type.

13. A system according to claim 12 wherein the transaction authorization module is configured to determine whether the requesting terminal is authorized by determining whether the requesting terminal identifier matches an authorized terminal identifier in the set of authorized terminal identifiers.

14. A system according to claim 12 wherein the associating module is further configured for associating, in the database, a set of one or more authorized transaction types with each authorized terminal identifier.

15. A system according to claim 14 wherein the transaction authorization module is configured to determine whether the requesting terminal is authorized by determining whether the requesting terminal identifier matches an authorized terminal identifier in the set of authorized terminal identifiers, and by comparing the requested transaction type to the set of authorized transaction types associated with the authorized terminal identifier.

16. A system according to claim 12 wherein the set of authorized terminal identifiers is based on authorization criteria comprising at least one of the set consisting of a terminal location requirement, a terminal ownership requirement, and terminal affiliation with a particular merchant.

17. A system according to claim 12 wherein the at least one transaction processing module includes at least one of the group consisting of a card activation module, a card value incrementation module, a card deactivation module, and a card value redemption module.

18. A system according to claim 12 further comprising:
a value module adapted to determine and store in the database, in response to a stored-value card transaction, a card value for the stored-value card of the transaction.

19. A computer program embodied in a computer-readable medium for processing a stored-value card transaction request in a card data management system having a central processor in communication with a plurality of point-of-sale terminals over a communications network, each of the one or more terminals having a unique terminal identifier and being associated with a location and a prepaid card merchant, the central processor being in communication with a database having stored therein a plurality of card records, each card record containing data associated with a stored-value card distributed to a prepaid card merchant for further distribution to purchasers at a location controlled by the prepaid card merchant, the computer program comprising instructions for performing a set of actions comprising:
receiving the stored-value card transaction request from a requesting terminal, the requesting terminal being one of the plurality of point-of-sale terminals, the transaction request comprising
a requesting terminal identifier,
a card identifier assigned to a stored value card, and
information indicative of a requested transaction type;
determining if the requesting terminal is authorized to request the requested transaction type for the stored value card;
responsive to a determination that the requesting terminal is authorized to request the requested transaction type, initiating the requested transaction; and
transmitting a request response to the requesting terminal.

20. A computer program according to claim 19 wherein the requested transaction type is one of the group consisting of card activation, card value incrementation, card deactivation, and card value redemption.

21. A computer program according to claim 19 wherein the set of actions further comprises:
associating in the database a set of authorized terminal identifiers with the stored-value card.

22. A computer program according to claim 21 wherein the action of determining if the requesting terminal is authorized comprises the action of:
comparing the requesting terminal identifier to the set of authorized terminal identifiers.

23. A computer program according to claim 21 wherein the set of actions further comprises:
determining criteria for authorizing terminals to request transactions for the stored value card; and
assembling the set of authorized terminal identifiers based on the criteria for authorizing.

24. A computer program according to claim 23 wherein the criteria for authorizing include at least one of the set consisting of a terminal location requirement, a terminal ownership requirement, and terminal affiliation with a particular merchant.

25. A computer program according to claim 21 wherein the set of actions further comprises:
associating in the database a set of one or more authorized transaction types with each authorized terminal identifier.

26. A computer program according to claim 25 wherein the action of determining if the requesting terminal is authorized further comprises the actions of:
comparing the requesting terminal identifier to the set of authorized terminal identifiers; and
responsive to a determination that the requesting terminal identifier matches an authorized terminal identifier, comparing the requested transaction type to the set of authorized transaction types associated with the authorized terminal identifier.

27. A computer program according to claim 19 wherein the stored-value card transaction is a card value redemption transaction and the transaction request further comprises a purchase amount.

28. A computer program according to claim 27 wherein the card record data includes a stored value for the stored-value card and the action of initiating the requested transaction comprises:
determining from the database the stored value associated with the stored-value card;
determining whether the purchase amount exceeds the stored value; and
responsive to a determination that the purchase amount does not exceed the stored value, subtracting the purchase amount from the stored value.

29. A computer program according to claim 28 wherein the action of initiating the requested transaction further comprises:
responsive to a determination that the purchase amount equals or exceeds the stored value, setting the stored value to zero.

* * * * *

(12) EX PARTE REEXAMINATION CERTIFICATE (8403rd)
United States Patent
Graves et al.

(10) Number: US 7,578,439 C1
(45) Certificate Issued: Jul. 12, 2011

(54) SYSTEM AND METHOD FOR AUTHORIZING STORED VALUE CARD TRANSACTIONS

(75) Inventors: Phillip Craig Graves, Atlanta, GA (US); Merrill Brooks Smith, Atlanta, GA (US); Phil M. Chakiris, Atlanta, GA (US)

(73) Assignee: JPMorgan Chase Bank, N.A., Dallas, TX (US)

Reexamination Request:
No. 90/011,070, Jun. 28, 2010

Reexamination Certificate for:
Patent No.: 7,578,439
Issued: Aug. 25, 2009
Appl. No.: 11/691,766
Filed: Mar. 27, 2007

Related U.S. Application Data

(63) Continuation-in-part of application No. 10/655,828, filed on Sep. 5, 2003, which is a continuation-in-part of application No. 10/411,971, filed on Apr. 11, 2003, now Pat. No. 7,083,084, which is a continuation of application No. 09/641,363, filed on Aug. 18, 2000, now Pat. No. 6,575,361.
(60) Provisional application No. 60/149,740, filed on Aug. 19, 1999.

(51) Int. Cl.
*G06K 5/00* (2006.01)

(52) U.S. Cl. ........................ 235/380; 705/14.17
(58) Field of Classification Search .......... 235/380
See application file for complete search history.

(56) References Cited

U.S. PATENT DOCUMENTS

| | | | |
|---|---|---|---|
| 3,553,440 A | 1/1971 | Dale |
| 4,068,213 A | 1/1978 | Nakamura |
| 4,317,957 A | 3/1982 | Sendrow |
| 4,482,802 A | 11/1984 | Aizawa |
| 4,734,858 A | 3/1988 | Schlafly |
| 4,747,049 A | 5/1988 | Richardson |
| 4,755,940 A | 7/1988 | Brachtl |
| 4,767,917 A | 8/1988 | Ushikubo |
| 4,795,892 A | 1/1989 | Gilmore |
| 4,877,947 A | 10/1989 | Mori |

(Continued)

FOREIGN PATENT DOCUMENTS

| | | |
|---|---|---|
| DE | 19641776 | 3/1997 |
| EP | 0406841 | 7/1990 |
| EP | 1197906 | 4/2002 |
| EP | 1361775 | 11/2003 |
| EP | 1522972 | 9/2004 |

(Continued)

OTHER PUBLICATIONS

International Standard ISO 8583, "Financial transaction card originated messages—Interchange message specifications," Second Edition, Dec. 15, 1993 ("ISO 8583").

William Wood, POS Terminals nab credit violators, Data Communications, Oct. 1982 at 114 ("Wood 1982").

(Continued)

*Primary Examiner* — Joshua D Campbell

(57) ABSTRACT

A computer-implemented method for processing a stored-value card transaction request in a card data management system is presented. The management system has a central processor in communication with one or more point-of-sale terminals over a communications network. Each terminal has a unique terminal identifier and is associated with a location and a prepaid card merchant. The central processor is in communication with a database having stored therein a plurality of card records. Each of these card records contains data associated with a stored-value card distributed to a prepaid card merchant for further distribution to purchasers at a location controlled by the prepaid card merchant. The transaction request comprises a requesting terminal identifier, a card identifier assigned to a stored value card and information indicative of a requested transaction type. The method further comprises determining if the requesting terminal is authorized to request the requested transaction type for the stored value card.

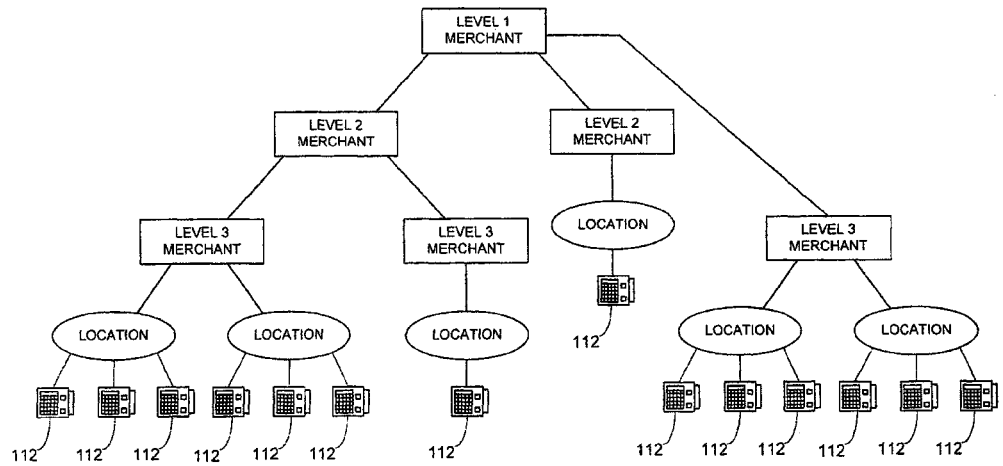

U.S. PATENT DOCUMENTS

| | | |
|---|---|---|
| 4,900,904 A | 2/1990 | Wright |
| 4,908,521 A | 3/1990 | Boggan |
| 4,943,707 A | 7/1990 | Boggan |
| 5,255,182 A | 10/1993 | Adams |
| 5,274,845 A | 12/1993 | Wang |
| 5,384,449 A | 1/1995 | Peirce |
| 5,477,038 A | 12/1995 | Levine |
| 5,500,513 A | 3/1996 | Langhans |
| 5,502,765 A | 3/1996 | Ishiguro |
| 5,511,114 A | 4/1996 | Stimson |
| 5,524,073 A | 6/1996 | Stambler |
| 5,577,109 A | 11/1996 | Stimson |
| 5,621,201 A | 4/1997 | Langhans |
| 5,621,787 A | 4/1997 | McKoy |
| 5,657,389 A | 8/1997 | Houvener |
| 5,673,309 A | 9/1997 | Woynoski |
| 5,679,938 A | 10/1997 | Templeton |
| 5,679,940 A | 10/1997 | Templeton |
| 5,696,909 A | 12/1997 | Wallner |
| 5,721,781 A | 2/1998 | Deo |
| 5,732,136 A * | 3/1998 | Murphree et al. ............. 705/77 |
| 5,760,381 A | 6/1998 | Stich |
| 5,777,305 A | 7/1998 | Smith |
| 5,812,668 A | 9/1998 | Weber |
| 5,815,561 A | 9/1998 | Nguyen |
| 5,828,740 A | 10/1998 | Khuc |
| 5,844,972 A | 12/1998 | Jagadish |
| 5,850,599 A | 12/1998 | Seiderman |
| 5,868,236 A | 2/1999 | Rademacher |
| 5,889,863 A | 3/1999 | Weber |
| 5,903,633 A * | 5/1999 | Lorsch ................... 379/114.2 |
| 5,918,909 A | 7/1999 | Fiala |
| 5,930,363 A | 7/1999 | Stanford |
| 5,945,653 A | 8/1999 | Walker |
| 5,956,695 A | 9/1999 | Carrithers |
| RE36,365 E | 11/1999 | Levine |
| 5,987,132 A | 11/1999 | Rowney |
| 5,991,748 A | 11/1999 | Taskett |
| 6,000,608 A | 12/1999 | Dorf |
| 6,003,014 A | 12/1999 | Lee |
| 6,016,480 A | 1/2000 | Houvener |
| 6,018,570 A | 1/2000 | Matison |
| 6,018,717 A | 1/2000 | Lee |
| 6,032,135 A | 2/2000 | Molano |
| 6,032,859 A | 3/2000 | Muehlberger |
| 6,038,549 A | 3/2000 | Davis |
| 6,072,870 A | 6/2000 | Nguyen |
| 6,073,842 A | 6/2000 | Yoshinaga |
| 6,094,643 A | 7/2000 | Anderson |
| 6,105,008 A | 8/2000 | Davis |
| 6,108,642 A | 8/2000 | Findley |
| 6,119,105 A | 9/2000 | Williams |
| 6,163,843 A | 12/2000 | Inoue |
| 6,167,387 A | 12/2000 | Lee-Wai-Yin |
| 6,169,975 B1 | 1/2001 | White |
| 6,173,272 B1 | 1/2001 | Thomas |
| 6,185,545 B1 | 2/2001 | Resnick |
| 6,189,787 B1 | 2/2001 | Dorf |
| 6,190,256 B1 | 2/2001 | Walker |
| 6,202,933 B1 | 3/2001 | Poore |
| 6,208,851 B1 | 3/2001 | Hanson |
| RE37,122 E | 4/2001 | Levine |
| 6,215,999 B1 | 4/2001 | Dorenbosch |
| 6,220,511 B1 | 4/2001 | Holec |
| 6,226,624 B1 | 5/2001 | Watson |
| 6,230,145 B1 | 5/2001 | Verderamo |
| 6,237,023 B1 | 5/2001 | Yoshimoto |
| 6,253,027 B1 | 6/2001 | Weber |
| 6,270,012 B1 | 8/2001 | Dawson |
| 6,282,566 B1 | 8/2001 | Lee, Jr. |
| 6,285,749 B1 | 9/2001 | Manto |
| 6,289,010 B1 | 9/2001 | Voit |
| 6,298,336 B1 | 10/2001 | Davis |
| 6,302,326 B1 | 10/2001 | Symonds |
| 6,304,915 B1 | 10/2001 | Nguyen |
| 6,308,887 B1 | 10/2001 | Korman |
| 6,314,171 B1 | 11/2001 | Dowens |
| 6,315,195 B1 | 11/2001 | Ramachandran |
| 6,315,206 B1 | 11/2001 | Hansen |
| 6,324,525 B1 | 11/2001 | Kramer |
| 6,332,135 B1 | 12/2001 | Conklin |
| 6,333,976 B2 | 12/2001 | Lesley |
| 6,334,525 B1 | 1/2002 | Kramer |
| 6,375,073 B1 | 4/2002 | Aebi |
| 6,381,631 B1 | 4/2002 | van Hoff |
| 6,386,457 B1 | 5/2002 | Sorie |
| 6,422,462 B1 | 7/2002 | Cohen |
| 6,424,706 B1 | 7/2002 | Katz |
| 6,434,238 B1 | 8/2002 | Chaum |
| 6,434,379 B1 | 8/2002 | Despres |
| 6,445,780 B1 | 9/2002 | Rosset |
| 6,467,684 B2 | 10/2002 | Fite |
| 6,473,500 B1 | 10/2002 | Risafi |
| 6,494,367 B1 | 12/2002 | Zacharias |
| 6,502,745 B1 | 1/2003 | Stimson |
| 6,507,644 B1 | 1/2003 | Henderson |
| 6,588,658 B1 | 7/2003 | Blank |
| 6,592,035 B2 | 7/2003 | Mandile |
| 6,648,222 B2 | 11/2003 | McDonald |
| 6,714,918 B2 | 3/2004 | Hillmer |
| 6,745,022 B2 | 6/2004 | Knox |
| 6,882,984 B1 | 4/2005 | Boyle |
| 6,918,537 B2 | 7/2005 | Graves |
| 6,925,439 B1 | 8/2005 | Pitroda |
| 6,961,412 B2 | 11/2005 | Ruckart |
| 7,028,891 B2 | 4/2006 | O'Neal |
| 7,043,451 B2 | 5/2006 | Strayer et al. |
| 7,054,842 B2 | 5/2006 | James |
| 7,090,138 B2 | 8/2006 | Rettenmyer |
| 7,145,989 B1 | 12/2006 | Bond |
| 7,171,199 B1 | 1/2007 | Rahman |
| 7,246,097 B2 | 7/2007 | Movalli |
| 7,269,256 B2 | 9/2007 | Rosen |
| 7,292,998 B2 | 11/2007 | Graves |
| 7,293,704 B2 | 11/2007 | Smith |
| 7,370,012 B2 | 5/2008 | Karns |
| 7,376,583 B1 | 5/2008 | Rolf |
| 7,389,275 B2 | 6/2008 | Kemper |
| 7,536,349 B1 | 5/2009 | Mik |
| 7,571,142 B1 | 8/2009 | Flitcroft |
| 7,580,859 B2 | 8/2009 | Economy |
| 2001/0001321 A1 | 5/2001 | Resnick |
| 2001/0001856 A1 | 5/2001 | Gould |
| 2001/0023415 A1 | 9/2001 | Keil |
| 2001/0042784 A1 | 11/2001 | Fite |
| 2002/0077076 A1 | 6/2002 | Suryanarayana |
| 2002/0088855 A1 | 7/2002 | Hodes |
| 2002/0091573 A1 | 7/2002 | Hodes |
| 2002/0101966 A1 | 8/2002 | Nelson |
| 2002/0107804 A1 | 8/2002 | Kravitz |
| 2002/0115424 A1 | 8/2002 | Bagoren |
| 2002/0119767 A1 | 8/2002 | Fieldhouse |
| 2002/0133457 A1 | 9/2002 | Gerlach |
| 2002/0138351 A1 | 9/2002 | Houvener |
| 2003/0014360 A1 | 1/2003 | Arditti |
| 2003/0046222 A1 | 3/2003 | Bard |
| 2003/0055782 A1 | 3/2003 | Slater |
| 2003/0061157 A1 | 3/2003 | Hirka |
| 2003/0070080 A1 | 4/2003 | Rosen |
| 2003/0078835 A1 | 4/2003 | Pluchinske |
| 2003/0092435 A1 | 5/2003 | Boivin |

| | | |
|---|---|---|
| 2003/0105672 A1 | 6/2003 | Epstein |
| 2003/0135462 A1 | 7/2003 | Brake |
| 2003/0144935 A1 | 7/2003 | Sobek |
| 2003/0174823 A1 | 9/2003 | Justice |
| 2003/0187781 A1 | 10/2003 | Arthus |
| 2003/0194988 A1 | 10/2003 | Knox |
| 2003/0236704 A1 | 12/2003 | Antonucci |
| 2004/0181453 A1 | 9/2004 | Ray |
| 2004/0195316 A1 | 10/2004 | Graves |
| 2004/0210449 A1 | 10/2004 | Breck |
| 2004/0210519 A1 | 10/2004 | Oppenlander |
| 2004/0215564 A1 | 10/2004 | Lawlor |
| 2004/0215573 A1 | 10/2004 | Teutenberg |
| 2004/0232225 A1 | 11/2004 | Bishop |
| 2004/0267663 A1 | 12/2004 | Karns |
| 2005/0060248 A1 | 3/2005 | O'Neal |
| 2005/0080678 A1 | 4/2005 | Economy |
| 2005/0203835 A1 | 9/2005 | Nhaissi |
| 2006/0026073 A1 | 2/2006 | Kenny, Jr. |
| 2006/0053056 A1 | 3/2006 | Alpach-Goss |
| 2006/0161490 A1 | 7/2006 | Chakiris |
| 2006/0207856 A1 | 9/2006 | Dean |
| 2006/0235754 A1 | 10/2006 | Walker |
| 2006/0255135 A1 | 11/2006 | Smith |
| 2006/0289621 A1 | 12/2006 | Foss, Jr. |
| 2007/0118478 A1 | 5/2007 | Graves |
| 2008/0041938 A1 | 2/2008 | Wise |
| 2008/0052770 A1 | 2/2008 | Ali |
| 2008/0109356 A1 | 5/2008 | Sutton |
| 2008/0109374 A1 | 5/2008 | Levergood |
| 2009/0078755 A1 | 3/2009 | Sullivan |
| 2010/0186076 A1 | 7/2010 | Ali |
| 2010/0306107 A1 | 12/2010 | Nahari |
| 2010/0317319 A1 | 12/2010 | Gorman |

FOREIGN PATENT DOCUMENTS

| | | |
|---|---|---|
| EP | 1534043 | 11/2004 |
| EP | 1705610 | 3/2006 |
| WO | 96/38801 | 12/1996 |
| WO | 96/41462 | 12/1996 |
| WO | 97/10560 | 3/1997 |
| WO | 97/46961 | 12/1997 |
| WO | 98/44429 | 10/1998 |
| WO | 98/49658 | 11/1998 |
| WO | 99/63744 | 12/1999 |
| WO | 00/50986 | 8/2000 |
| WO | 03/079159 | 9/2003 |
| WO | 2005/024591 | 9/2004 |

OTHER PUBLICATIONS

Press Release, First Data Corp, CES/NaBANCO Introduces Stored Value Card Technology: Blockbuster Video is First Merchant Partner, Jan. 15, 1996.

Blockbuster Wraps Prepaid Product in Greeting Cards for Dad and Grad, Debit Card News, Jun. 18, 1997, at 3.

Blockbuster Seeks Branding Partner, Debit Card News, Sep. 28, 1995, at 8.

Press Release, First Data Corp., First Data Supports Pilot for Shell Oil Pre–paid Card, Aug. 29, 1996.

MicroTrax, Ltd., PC Electronic Payment Systems Reference Manual, 1995.

ValueLink Product Information, 1997.

Craig Levitt, Busy Signal, Supermaket Business, Sep. 1998, at 131.

Call Them Just Another Product, Supermarket Business, Feb. 1996, at 81.

Allene Symons, Calling Cards Ring Clear for Drug Chains, Drug Store News, Mar. 1, 1999, at 39.

Bari Adelman, Jockeying for Position, Supermarket Business, Jan. 1999, at 59.

Kmart's Newest Blue Light Special: Cash Cards, Credit Card News, Aug. 15, 1997, at 7.

LCI International Introduces Breakthrough S.A.F.E.R. (SM) System for Universal Point–of–Sale Activation of Prepaid Calling Cards, Business Wire, May 4, 1998, at 1.

Press Release, Qwest Communications International Inc., Qwest Communications selected as Preferred Provider of Prepaid Phone Cards for CITGO Petroleum Corporation, May 3, 1999.

Patricia A. Murphy, New Breeds of Debit Cards Offer Expanded Opportunities for Retailers, Stores, May 1999, at 76.

Lisa Guss, Phone Cards: It's Your Call, Supermarket Business, Jan. 1998, at 51.

Pictured Much Smaller Than Actual Size, Supermaket News, May 1994.

Retailers Expand Stored Value Cards as Alternative to Paper Gift Certificates, Stores, Nov. 1998, at 28.

Michael Hartnett, Retailers Flock to Pre–paid Phone Cards, Stores, Jul. 1996, at 54.

Carol Radice, Ringing Up Sales, Progressive Grocer, Jan. 1996, at 141.

Seth Mendelson, Serious Numbers, Oct. 1996, at 51.

SmarTalk Launches Point–of Sale Activation for Prepaid Phone Cards Via American Express Card Authorization System, Business Wire, Aug. 24, 1998, at 1.

SmarTalk Will Use the American Express Brand to Go Global, Credit Card News, Jan. 15, 1998, at 6.

Sprint Streamlines Card Activation, Supermarket Business, Dec. 1997, at 43.

Laurie Freeman, Supermarkets Get the Call, Supermarket Business, May 1999, at 127.

Smart Card Update, Retail Delivery Systems News, Sep. 26, 1997.

Press Release, DataCash Ltd., Innovative & Improved Services with DataCash 2.4, Oct. 7, 1998.

In Search of the Complete Web Payment System, Electronic Commerce News, May 27, 1996, at 1.

EFT at the Point–of–Sale, ICP Banking Software, Autumn 1985, at 9.

European Patent Office, "Description of DE 19641776."

David Legg, Debit Cards—the Retailer's Perspective, Banking World, Jun. 1988, at 60.

Robert Jennings, First Data and Celltel Offering Wireless Credit Authorization, American Banker, Mar. 21, 1995, at 11.

Matt Barthel, NYCE Offers a PC System for Point–of–Sale Operations, American Banker, Mar. 31, 1992, at 3.

Rob Wells, Authorizing a Credit–Card Sale is Incredible 20–Second Journey in Electronic Banking, The Sale Lake Tribune, Dec. 19, 1993, at F10.

Roger Clarke, Privacy Issues in Smart Card Applications in the Retail Financial Sector, in Smart Cards and the Future of Your Money, Jun. 1996, at 157.

Robert Fram et al., Altered States: Electronic Commerce and Owning the Means of Value Exchange, 1999 Stan. Tech. L. Rev. 2 (1999),http://stlr.stanford.edu/STLR/Articles/99_STLR_2.

Gerald Sruber, The Electronic Purse: An Overview of Recent Developments and Policy Issues, Bank of Canada, Jan. 1996.

John P. Caskey & Gordon H. Sellon, Jr., Is the Debit Card Revolution Finally Here?, Federal Reserve Bank of Kansas City Economic Review, Fourth Quarter 1994, at 79.

Stacey L. Schreft, Looking Forward: The Role for Government in Regulating Electronic Cash, Federal Reserve Bank of Kansas City Economic Review, Fourth Quarter 1997, at 59.

Basle, Security of Electronic Money, Report by the Committee on Payment and Settlement Systems and the Group of Computer Experts of the Central Banks of the Group of Ten Countries, Aug. 1996.

William Roberds, What's Really New about the New Forms of Retail Payment?, Federal Reserve Bank of Atlanta Economic Review, First Quarter 1997, at 32.

Felix Stalder & Andrew Clement, Exploring Policy Issues of Electronic Cash: The Mondex Case, Canadian Journal of Communication, vol. 24, No. 2 (1999).

IBM 4680 General Sales Application Electronic Funds User's Guide, First Edition, Dec. 1990.

Electronic Funds Transfer Feature Enhancement: User's Guide, First Edition, Sep. 1995.

IBM 4680-4690 Advanced Payment System for General Sales Application, Second Edition, Jul. 1996.

U.S. Appl. No. 60/108,762, "Electronic Payment System", David Resnick, Published Feb. 6, 2001.

U.S. Appl. No. 60/141,994, "Precash Payment System", David Resnick, Published Feb. 6, 2001.

International Standard ISO 8583, Financial Transaction card originated messages—Interchange message specifications, Second edition, Dec. 15, 1993.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1, 3-7, 12, 14, 16, 19 and 21-25 is confirmed.

Claims 2, 8-11, 13, 15, 17, 18, 20 and 26-29 were not reexamined.

* * * * *